_United States Patent Office_

3,255,189
Patented June 7, 1966

3,255,189
ALKYL 7,8-DIHYDROXY-2-OXO-2H-1,4-BENZOXAZIN-3-ACETATES
Robert B. Moffett, Kalamazoo, Mich., assignor to The Upjohn Company, Kalamazoo, Mich., a corporation of Delaware
No Drawing. Filed Nov. 20, 1963, Ser. No. 325,178
2 Claims. (Cl. 260—244)

This invention relates to novel chemical compounds and to a process for preparing the same and is particularly directed to alkyl 7,8-dihydroxy-2-oxo-2H-1,4-benzoxazin-3-acetates and the preparation thereof.

The novel compounds of the invention have the following structural formula

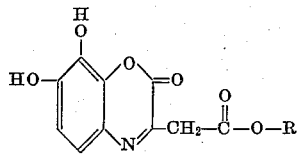

wherein R is lower-alkyl of from 1 to 4 carbon atoms, inclusive, e.g., methyl, ethyl, propyl, butyl and the isomeric forms thereof.

The novel compounds of the invention are prepared by condensing 4-aminopyrogallol with a dialkyl oxalacetate of the formula

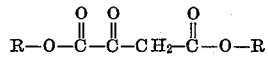

wherein R is as defined above.

The condensation is accelerated by gentle heating (from room temperature, about 25° C., to about 180° C.) and advantageously is carried out in a non-oxidizing atmosphere, for example, nitrogen. The proportions of reactants can be varied over a wide range. Equimolar amounts can be used, though in general it is preferred to use an excess of the dialkyl oxalacetate, say up to about 100% excess. An inert solvent, for example, toluene, ethanol, dioxane, and tetrahydrofuran can be used if desired.

The novel compounds of the instant invention have sedative and tranquilizing activity and can be used to calm agitated mammals or animals, e.g., laboratory rats and mice. The compounds also have analgetic activity and can be used to lessen pain sensation. Further, the compounds can be used to inhibit the O-methyl transferase enzyme system by introduction of the said compounds into the said enzyme system environment.

The invention can be more fully understood by reference to the following example, which is given by way of illustration and not of limitation.

Example 1.—Ethyl 7,8-dihydroxy-2-oxo-2H-1,4-benzoxazin-3-acetate

A solution of 0.06 mole of 4-aminopyrogallol hydrochloride in 100 ml. of ethanol was prepared by hydrogenation of 10.27 gm. (0.06 mole) of 4-nitropyrogallol in the presence of hydrogen chloride. To the ethanolic 4-aminopyrogallol hydrochloride solution was added 25.2 gm. (0.12 mole) of diethyl oxalacetate sodium salt. The mixture was shaken under nitrogen for 2.5 hours, heated to the boiling point, cooled, and concentrated to dryness under reduced pressure. The residue was shaken with water and extracted with ether. The ether solution was washed with water and then with saturated aqueous sodium chloride solution, and dried over sodium sulfate. After filtration, the ether solution was evaporated leaving 25.6 gm. of light brown oil which soon crystallized. The solid was boiled with 200 ml. of benzene, cooled, and filtered giving 13.3 gm. of yellow solid having a melting point of 155–157° C. The yellow solid was recrystallized from 100 ml. of ethyl acetate, giving 9.5 gm. of yellow ethyl 7,8-dihydroxy-2-oxo-2H-1,4-benzoxazin-3-acetate having a melting point of 156–158.5° C.

Anal.—Calcd. for $C_{12}H_{11}NO_6$: C, 54.34; H, 4.18; N, 5.28. Found: C, 54.43; H, 4.18; N, 5.46.

In place of the diethyl ester of oxalacetic acid there can be substituted any other di-lower-alkyl oxalacetate, e.g., the methyl, propyl, isopropyl, butyl and sec-butyl esters to give the corresponding esters of 7,8-dihydroxy-2-oxo-1,4-benzoxazin-3-acetic acid.

What is claimed is:
1. A compound of the formula

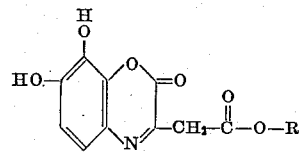

wherein R is lower-alkyl of from 1 to 4 carbon atoms, inclusive.

2. Ethyl 7,8-dihydroxy-2-oxo-2H-1,4-benzoxazin-3-acetate.

References Cited by the Examiner
UNITED STATES PATENTS
3,105,071   9/1963   Moffett _____ 260—244
FOREIGN PATENTS
563,113   12/1957   Belgium.

WALTER A. MODANCE, _Primary Examiner._
ROBERT T. BOND, _Assistant Examiner._